United States Patent [19]

Eberhart

[11] Patent Number: 5,680,804
[45] Date of Patent: Oct. 28, 1997

[54] STEERING VALVE WITH ACTIVATION THRESHOLD

[75] Inventor: Eugen Eberhart, Düsseldorf, Germany

[73] Assignee: TRW Fahrwerksysteme GmbH & Co. KG, Dusseldorf, Germany

[21] Appl. No.: 409,013

[22] Filed: Mar. 23, 1995

[51] Int. Cl.⁶ ................................. B62D 5/083
[52] U.S. Cl. .................. 91/375 A; 137/625.24; 464/38; 464/39; 464/97
[58] Field of Search ............... 91/375 R, 375 A, 91/389; 137/625.24; 464/97, 38, 39

[56] References Cited

U.S. PATENT DOCUMENTS

| | | | |
|---|---|---|---|
| 4,774,847 | 10/1988 | Breitweg | 464/97 X |
| 5,001,824 | 3/1991 | Ayers | 464/38 X |
| 5,361,861 | 11/1994 | Miller | 91/374 A X |

FOREIGN PATENT DOCUMENTS

| | | |
|---|---|---|
| 0244449 | 10/1986 | European Pat. Off. . |
| 0327450 | 4/1992 | European Pat. Off. . |
| 0729874 | 9/1996 | European Pat. Off. . |
| 3634215 | 4/1987 | Germany . |
| 3934468 | 4/1990 | Germany . |
| 4220624 | 1/1994 | Germany . |
| 4240619 | 6/1994 | Germany ............... 91/375 A |

*Primary Examiner*—Allan D. Herrmann
*Attorney, Agent, or Firm*—Tarolli, Sundheim, Covell Tummino & Szabo

[57] ABSTRACT

A steering valve (1) for supplying an actuator with hydraulic pressure, consists of an input shaft (2), an output shaft (3), a torque rod (4), connected at one end to the input shaft (2) and at the other end to the output shaft (3), and a valve sleeve (5) surrounding the input shaft (2). A torsionally resistant, axially elastic element (9) is contained within the steering valve (1), connected at one end to the input shaft (2) and at the other end to a catch device (10). The catch device (10) ensures no relative displacement between the valve sleeve (5) and the input shaft (2); prior to a predetermined degree of torque, and converts the torque acting upon the input shaft (2) to axial forces acting upon the elastic element (9) until a release position is reached. The elastic element (9) is mounted on the input shaft (2) by means of a bearing sleeve (11), which is fixed in an axial position on the input shaft (2).

9 Claims, 2 Drawing Sheets

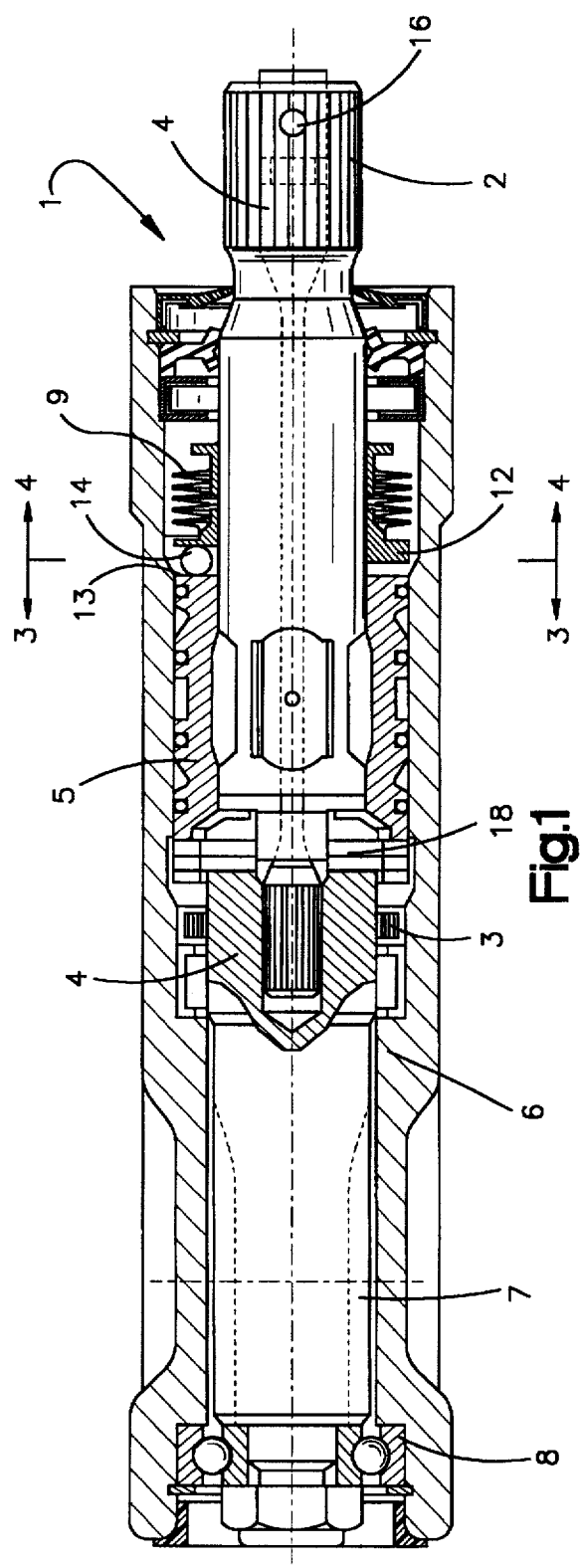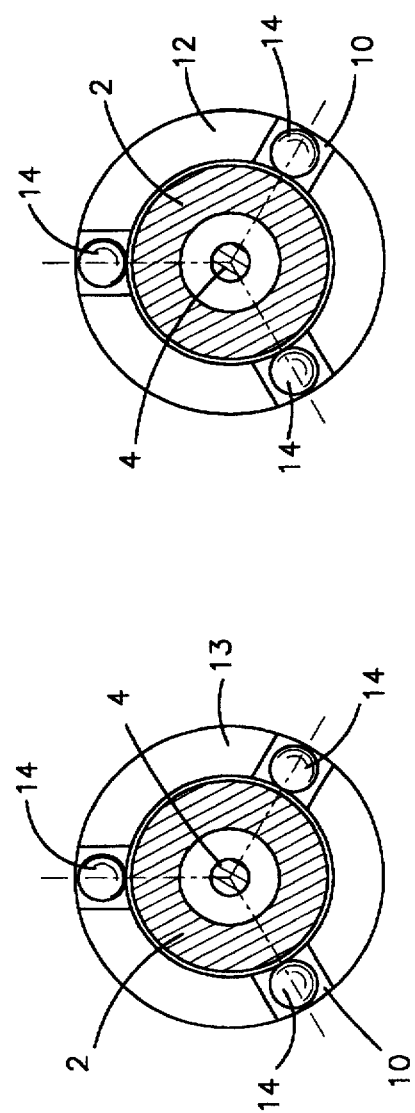

STEERING VALVE WITH ACTIVATION THRESHOLD

BACKGROUND OF THE INVENTION

1. Field of the Invention

The invention pertains to a steering valve for supplying an actuator with hydraulic pressure, consisting of an input shaft, an output shaft, a torque rod connected at one end to the input shaft, and a valve sleeve surrounding the input shaft, while a torsion-resistant, axially elastic element is contained within the steering valve connected at one end to the input shaft and at the other end to an catch device, which ensures no relative displacement between the valve sleeve and the input shaft prior to a predetermined degree of torque and which converts the torque acting upon the input shaft to axial forces acting upon the elastic element until a release position is reached.

2. Description of the Prior Art

Steering valves of this general type are in use especially in automatic steering systems. The construction of such automatic steering systems is familiar. An input shaft is connected by a torque rod to an output shaft equipped with a pinion gear. The pinion gear acts upon the steering rack of a steering mechanism. The use of steering valves for steering systems of this type is known. For this purpose, it is known that a valve sleeve is provided, which is engaged with the output shaft and surrounds the input shaft. Hydraulic fluid under pressure is pumped through the system by a pump. With torque of the input shaft relative to the valve sleeve, hydraulic pressure is applied to a hydraulic motor, which reinforces the movement of the steering rack in one of the two possible directions.

The activation of such steering valves is accomplished by torque of the input shaft in relation to the output shaft, wherein a torsional moment must be overcome by the intervening torque rod. The disadvantage of such steering valves is that the system requires that control always be executed by way of the angle of torsion of the torque rod in order to achieve a steering actuation. This is especially disadvantageous when, due to conditions of low force, no hydraulic backup would really be required, but rather a manual steering operation would be adequate. This is the case, e.g., at high speeds, for example in expressway driving. In the most unfavorable situation, the driver turns the steering wheel several finger Widths without achieving a steering motion. This is generally perceived by the operator as uncomfortable, since, due to this apparent play around the medial position, a direct and precise steering behavior, such as that offered, e.g., by mechanical steering, cannot be achieved. Thus, there exists a demand for a steering valve with an activation threshold, so that the steering gear behaves in the manner of a mechanical steering gear below a predetermined degree of torque, so that practically even slight movements of the steering wheel will be followed immediately and directly by a steering response.

While it is true that so-called centering devices are known with which an intensified aligning torque can be produced in the centering position of a steering valve, such centering devices, such as that known, e.g., from European Patent No. 0.244,449, are beset with a number of disadvantages. Because of the number of additional parts used, especially the Connecting parts, centering devices are uneconomical from the production point of view. Furthermore, they increase the space requirement, i.e., the steering valve becomes larger, since connecting sleeves must be incorporated between the torque rod and the input shaft or valve sleeve. In addition, such centering devices are very costly in respect to assembly, since, in comparison with ordinary steering valves, a greater number of parts must be centered in relation to each other. E.g., the connecting parts must be centered relative to the torque rod and to each other, then the input and output shafts must be centered relative to each other and relative to the centering device, and finally the valve sleeve must be centered relative to the input shaft. Furthermore, the aligning moments in the case of known centering devices are not adjustable, since they are situated between the end faces of sleeves and the length of the element exerting a force is predetermined. One must therefore rely on varying the spring element when wishing to change the torque. It follows that such familiar Centering devices are neither economical nor technically practical for use in producing an activation threshold for a steering valve of this general type.

Known from German Patent (Offenlegungsschrift) No. 3,634,215 is a steering valve of this general type, in which a centering spring in the form of a leaf spring is affixed to a cylindrical extension of the rotary slide parallel to the torque rod, which has a recess on the leaf spring part. On one of its faces, the valve sleeve has a tapered recess. Held between the two recesses is a ball. The activation threshold is dependent upon the elasticity of the leaf-like centering spring, which is not adjustable.

Such steering valves of this general type provide, by means of the elastic element, an activation threshold in the form of a spring resistance to be overcome by the input torque, while there exists no possibility of adjusting the determinative spring resistance to the torque of the elastic element necessary for activation.

SUMMARY OF THE INVENTION

Proceeding from this state of the art, the fundamental objective of the invention is to improve upon a steering valve of this general type in such a way that it is simple and economical to fabricate and install, in particular to center, requires no more space in comparison with known steering valves, and provides an activation threshold while functioning safely.

In the technical realization of this objective, the steering valve of the general type cited above is further refined in such a way that the elastic element is mounted on the input shaft by means of a bearing sleeve, which is fixed on the input shaft in an axial position.

With the steering valve of the invention, an activation threshold in the form of a spring resistance to be overcome by the input torque is provided by the elastic element, while the elastic element can be advantageously screwed or welded onto the outer surface of the input shaft. Due to the simple parts to be merely added to an ordinary steering valve, the economic cost is very low. The centering is also very simple, since the input shaft, the valve sleeve, and the output shaft can be mutually aligned in the usual manner, while the elastic element can be subsequently fixed in situ. This then automatically results in the advantage of simple adjustment of the activation threshold moment, since the axial pretensioning of the elastic element can be varied during installation in relation to the location of its fixation on the input shaft.

It is advantageous that the elastic element be a leaf or a plate-like spring element. For example, leaf spring-like strips of resilient metal can be screwed or welded onto the input shaft and engaged at their other end with a commensurate catch device. Instead of strips, it is possible to use plates that are essentially shaped to match the outer contour of the input shaft. Of course, undivided spring cages can also be used. The use of materials other than metal is also within the scope of the invention. What is important is that the criteria of torsional resistance and axial elasticity be met. Torsional resistance ensures that no torsional distortion occurs between the input and the output shafts or between the input shaft and the valve sleeve when the torque applied to the input shaft is slight. The torsionally resistant, axially elastic element transfers this torque to the valve sleeve via the catch device. As the torque increases, the axial force transferred by the catch device to the elastic element becomes greater until the axially elastic element is axially disengaged from the catch device, so that a relative torsional distortion takes place between the input shaft and the valve sleeve, and the steering valve is activated.

In keeping with another proposal of the invention, this function can also be fulfilled by a torsionally resistant spiral spring. Also, within the scope of the invention is the use of a spiral spring, which is joined to the catch device by a pivot bearing, wherein the catch device is axially displaceable relative to the input shaft yet secured against radial displacement. To this end, the catch device can be mounted on the input shaft in the form of a ring provided with an inner groove, in which an axially displaceable cam rides. A spiral spring with an appropriate spring constant can then be affixed at one end to the input shaft and rotationally mounted in relation to the catch ring at the other end.

According to one advantageous configuration of the invention, the elastic element is a metal expansion bellows. This combines the further advantage of linear spring resistance with the advantages of torsional resistance and axial elasticity.

In the advantageous fashion, the elastic element can also be fastened to an annular bearing formed or positioned on the input shaft. In keeping with a simple proposal of the invention, the catch device consists of an essentially V-shaped slot on the face of the valve sleeve. Alternatively, the catch device can be designed as a slanted cam track on the outer circumference of the valve sleeve. In a particularly advantageous version, the catch device is a ball coupling, in which ball bearings are situated between coupling rings, in which interactive recesses are formed. The recesses have a curved or essentially V-shaped profile, so that the two coupling rings are moved axially apart by the balls running in the recesses when relative torque is applied. According to one proposal of the invention, the coupling rings are sintered parts. In addition to the desired material properties, any reasonable bearing contours can be formed in the most simple manner using the sintering process. Advantageously, three recesses with identical angles of separation are formed in the face of each of the sintered rings for holding the balls.

BRIEF DESCRIPTION OF THE DRAWINGS

Further advantages and characteristics of the invention are set forth in the following description with reference to the appended drawings. Illustrated are:

FIG. 1, a cross-sectional depiction through an embodiment example of a steering valve in keeping with the invention, FIG. 2, an enlarged, cross-sectional depiction of the input shaft area of the steering valve in FIG. 1, FIG. 3, a sectional view taken along the line 3—3 of FIG. 1, and FIG. 4, a sectional view taken along the line 4—4 of FIG. 1.

DESCRIPTION OF THE PREFERRED EMBODIMENTS

Figure 2:
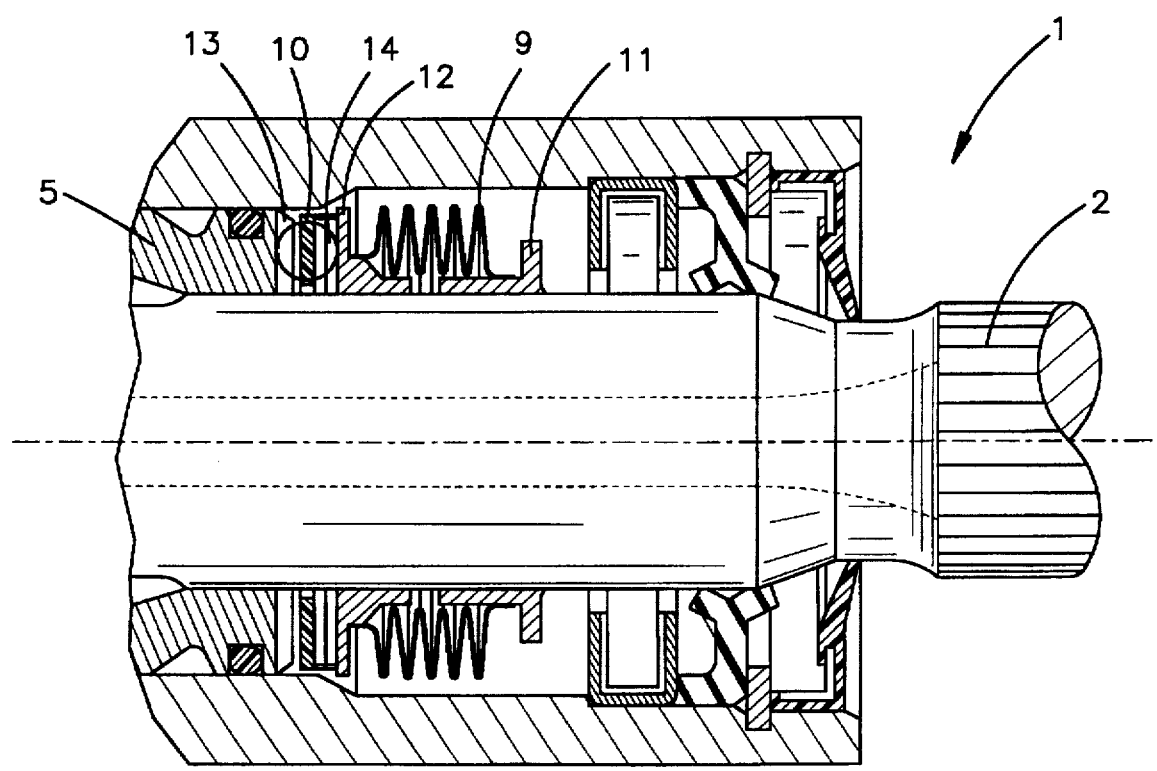

The steering valve (1) shown in the figures includes an input shaft (2) and an output shaft (3), which are connected by means of a torque rod (4). The input shaft (2) is connected to the torque rod (4) by a pin (16). The input shaft (2) is surrounded by a valve sleeve (5), which is joined to the output shaft (3) by a pin (18). These parts are contained within a housing (6). The output shaft (3) has a pinion gear (7), by means of which the steering rack of a steering mechanism (not shown) can be moved. The shafts are mounted in the housing on bearings (8) that permit torsional rotation. Fixed onto the input shaft is a torsionally resistant, axially elastic element in the form of a metal expansion bellows (9). As can be seen in FIG. 2, an annular bearing sleeve (11), welded to the input shaft at the appropriate position, is used for this purpose. The other end of the elastic element (9) is fastened to the coupling ring (12) of a ball coupling forming a catch device (10). On its surface facing the elastic element, the valve sleeve (5) also has a coupling ring (13), which can be either placed onto the valve sleeve as an additional part formed directly on the valve sleeve. On their opposing faces, the coupling rings (12 and 13) (FIGS. 3 and 4) have essentially V-shaped recesses into which balls (14) are fitted. Preferably, there are three recesses in each of the coupling rings (12 and 13) which are situated at identical angles of separation on the faces of the coupling rings and three balls (14) located in the recesses. With relative radial displacement of the two coupling rings (12 and 13), an axial force is applied to the coupling ring (12), which opposes the spring resistance of the elastic element (9). As soon as this torque-dependent force overcomes the spring resistance of the elastic element (9), the input shaft (2) can be displaced relative to the valve sleeve (5) and the steering valve can be activated.

It is obvious that, by virtue of this arrangement, the steering valve of the invention is provided with an activation threshold. The torque necessary for the activation is dependent upon the spring resistance of the elastic element (9), so that it can be adjusted at the time of assembly. The elastic element (9) is pretensioned and the annular sleeve (11) is affixed to the input shaft, whereby the torque necessary for rotary displacement is set. As far as the centering of the steering valve is concerned, nothing is changed in comparison with conventional designs. The space requirement is barely increased in comparison with that of a conventional steering valve. The parts used can be produced simply and economically and are practically maintenance-free. The invention can be realized with various types of elastic elements and catch devices.

List of reference numbers:

1 Steering valve
2 Input shaft
3 Output shaft
4 Torque rody
5 Valve sleeve
6 Housing
7 Pinion gear
8 Bearing
9 Elastic element
10 Catch device
11 Annular sleeve
12 Coupling ring
13 Coupling ring
14 Ball

I claim:

1. Steering valve for supplying an actuator with hydraulic pressure, said steering valve comprising:
   an input shaft (2);
   an output shaft (3);
   a torque rod (4) connected at a first end to said input shaft (2) and at a second end to said output shaft (3);
   a valve sleeve (5) surrounding said input shaft (2); and
   a torsionally resistant, axially elastic element (9) contained within said steering valve (1), said torsionally resistant, axially elastic element (9) being connected at a first end to said input shaft (2) and at a second end to a catch device (10), said catch device (10) ensuring no relative movement between said input shaft (2) and said valve sleeve (5) prior to a predetermined degree of torque being applied to said input shaft (2), said catch device (10) having means for converting torque acting upon said input shaft (2) to axial forces acting upon said elastic element (9) until a release position of said catch device (10) is reached, characterized by the fact that said elastic element (9) is mounted on said input shaft (2) by means of a bearing sleeve (11), said bearing sleeve (11) being fixed in an axial position on the input shaft (2).

2. Steering valve according to claim 1, characterized by the fact that the bearing sleeve (11) is welded onto the input shaft (2).

3. Steering valve according to claim 1, characterized by the fact that the elastic element is a metal expansion bellows.

4. Steering valve according to claim 1, characterized by the fact that the catch device is an essentially V-shaped slot formed on the face of the valve sleeve.

5. Steering valve according to claim 1, characterized by the fact that the catch device is a ball coupling.

6. Steering valve according to claim 5, characterized by the fact that the ball coupling encompasses sintered coupling rings (12, 13).

7. Steering valve according to claim 6, characterized by the fact that the coupling rings (12, 13) have three ball retainer recesses, which are situated at identical angles of separation on the faces of the coupling rings.

8. Steering valve according to claim 1, characterized by the fact that said torsionally resistant, axially elastic element (9) circumscribes at least a portion of said input shaft (2).

9. A steering valve for supplying an actuator with hydraulic pressure, said steering valve comprising:
   an input shaft (2);
   an output shaft (3);
   a torque rod (4) connected at a first end to said input shaft (2) and at a second end to said output shaft (3);
   a valve sleeve (5) surrounding said input shaft (2); and
   a torsionally resistant, axially elastic element (9) contained within said steering valve (1) and circumscribing a portion of said input shaft (2), said torsionally resistant, axially elastic element (9) being connected at a first end to said input shaft (2) and at a second end to a catch device (10), said catch device (10) ensuring no relative movement between said input shaft (2) and said valve sleeve (5) prior to a predetermined degree of torque being applied to said input shaft (2), said catch device (10) having means for converting torque acting upon said input shaft (2) to axial forces acting upon said elastic element (9) until a release position of said catch device (10) is reached, said elastic element (9) being mounted on said input shaft (2) by means of a bearing sleeve (11), said bearing sleeve (11) being movable in an axial direction relative to said input shaft (2) to adjust a preload on said elastic element (9) prior to said bearing sleeve (11) being fixed in an axial position on the input shaft (2).

* * * * *